United States Patent [19]

Soroka et al.

[11] Patent Number: 4,571,149

[45] Date of Patent: Feb. 18, 1986

[54] GENERAL PURPOSE ORTHOGONAL AXES MANIPULATOR SYSTEM

[75] Inventors: Daniel P. Soroka, Imperial; Mark S. Stoutamire, Carnegie, both of Pa.

[73] Assignee: Westinghouse Electric Corp., Pittsburgh, Pa.

[21] Appl. No.: 485,076

[22] Filed: Apr. 14, 1983

[51] Int. Cl.⁴ .............................................. B65G 65/00
[52] U.S. Cl. ..................................... 414/750; 901/13; 901/16
[58] Field of Search ............... 414/749, 750, 751, 753; 901/16, 11, 13, 23, 9

[56] References Cited

U.S. PATENT DOCUMENTS

| | | | |
|---|---|---|---|
| 2,353,437 | 7/1944 | Bock | 212/131 |
| 2,820,187 | 1/1958 | Parsons et al. | 318/39 |
| 3,093,252 | 1/1963 | Cahill | 414/281 |
| 3,093,781 | 6/1963 | Anke et al. | 318/162 |
| 3,606,162 | 9/1971 | Lehmann | 239/227 |
| 3,884,363 | 5/1975 | Ajlouny | 414/751 |
| 4,192,986 | 3/1980 | Udagawa et al. | 901/16 X |
| 4,196,049 | 4/1980 | Burns et al. | 901/23 X |
| 4,208,619 | 6/1980 | Delebecque et al. | 318/4 |
| 4,229,136 | 10/1980 | Panissidi | 901/16 X |
| 4,274,801 | 6/1981 | Herb et al. | 414/749 X |
| 4,317,560 | 3/1982 | Troyer | 901/16 X |
| 4,445,184 | 4/1984 | Noguchi | 901/13 X |

Primary Examiner—Robert J. Spar
Assistant Examiner—Donald W. Underwood
Attorney, Agent, or Firm—Michael P. Lynch; Thomas R. Trempus

[57] ABSTRACT

A gantry type orthogonal axes manipulator system including a rack and pinion mechanical drive for the X and Y axis assemblies and a ball screw mechanical drive for the Z axis assembly employs closed loop DC servo electrical drives controlled by the conventional numerical control techniques.

A rotary index feature permits horizontal rotation of the Y axis assembly, which supports the Z axis assembly, at the end of travel of the X axis assembly to service work zones on either side of the X axis assembly.

18 Claims, 13 Drawing Figures

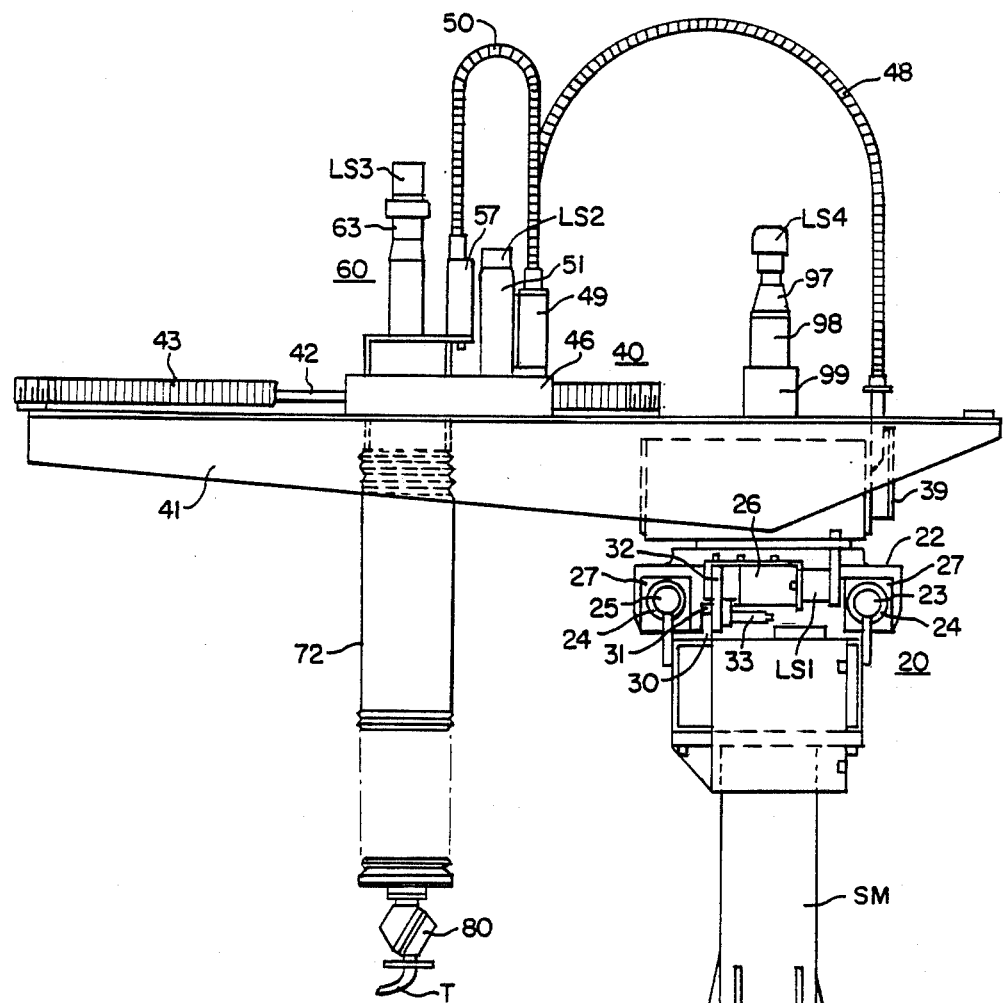
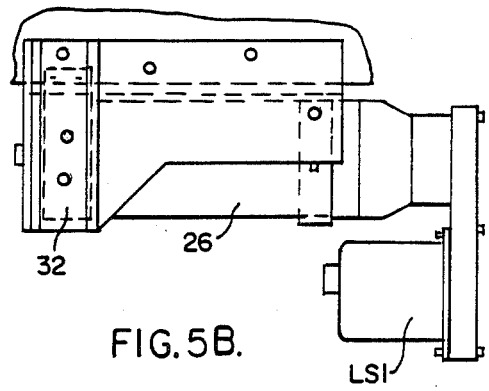
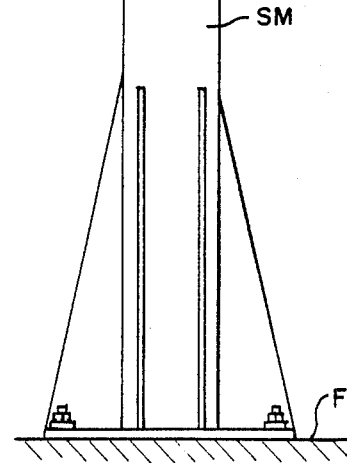
FIG. 5B.
FIG. 5A.

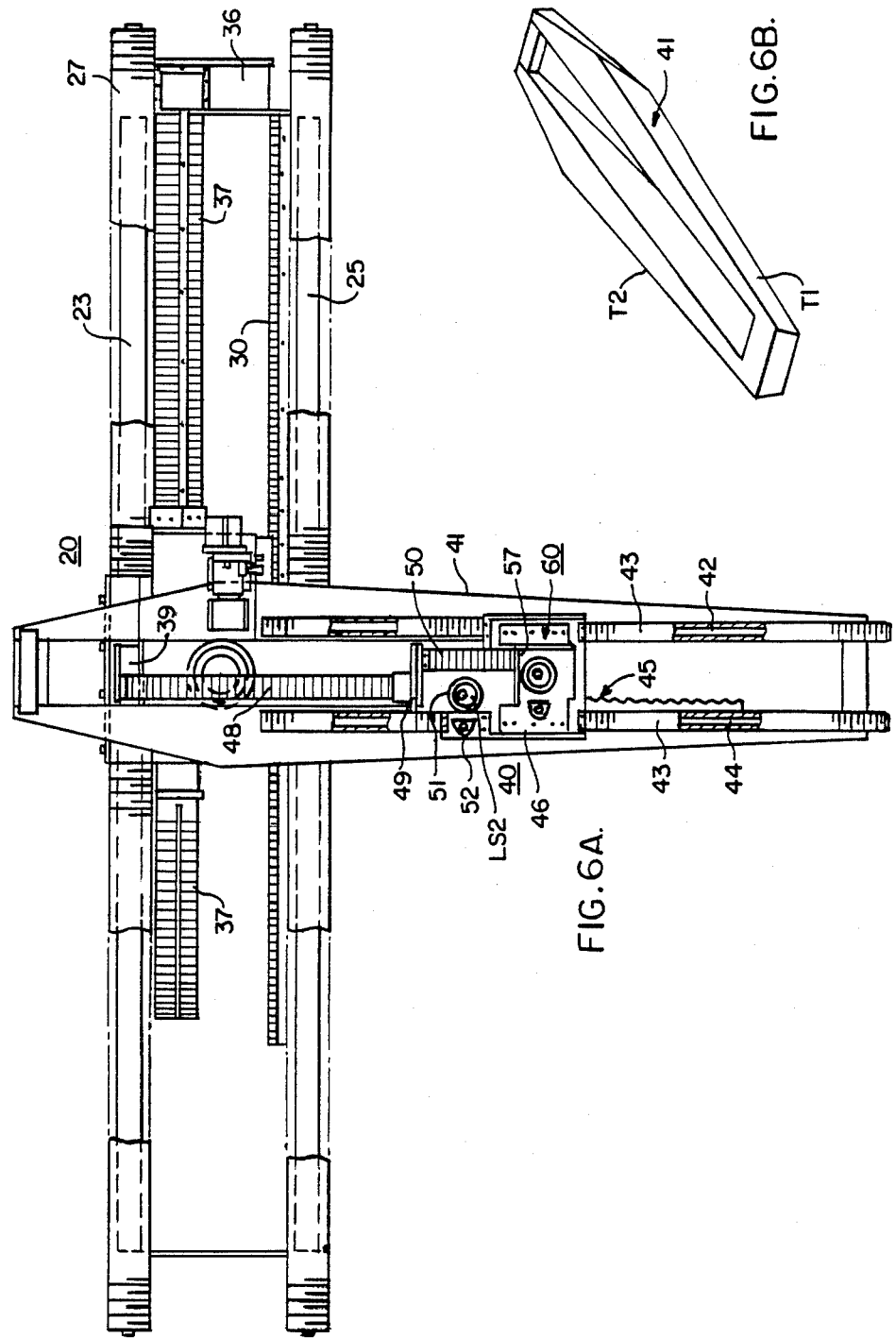

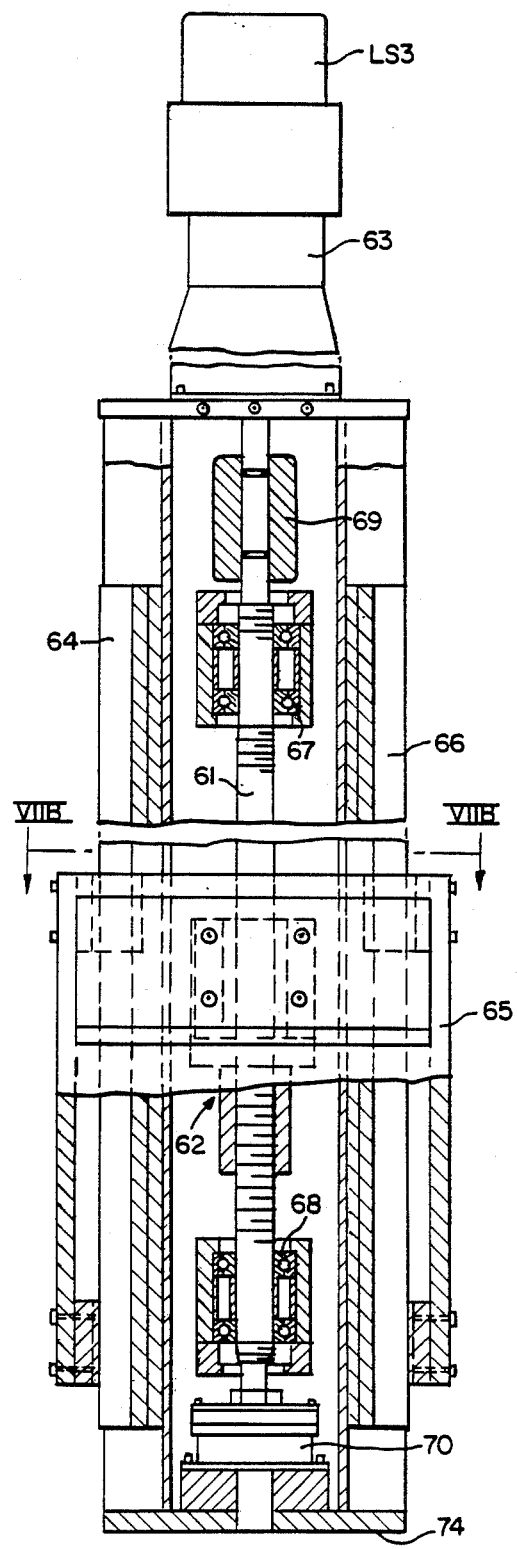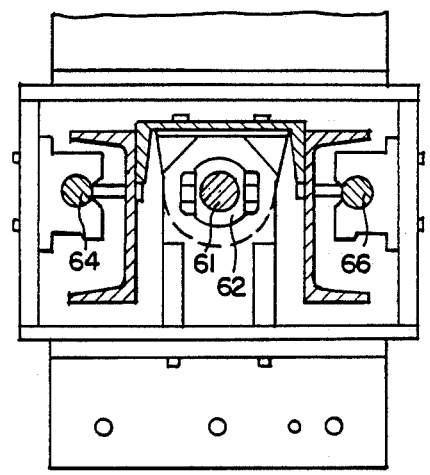
FIG. 7B.
FIG. 7A.

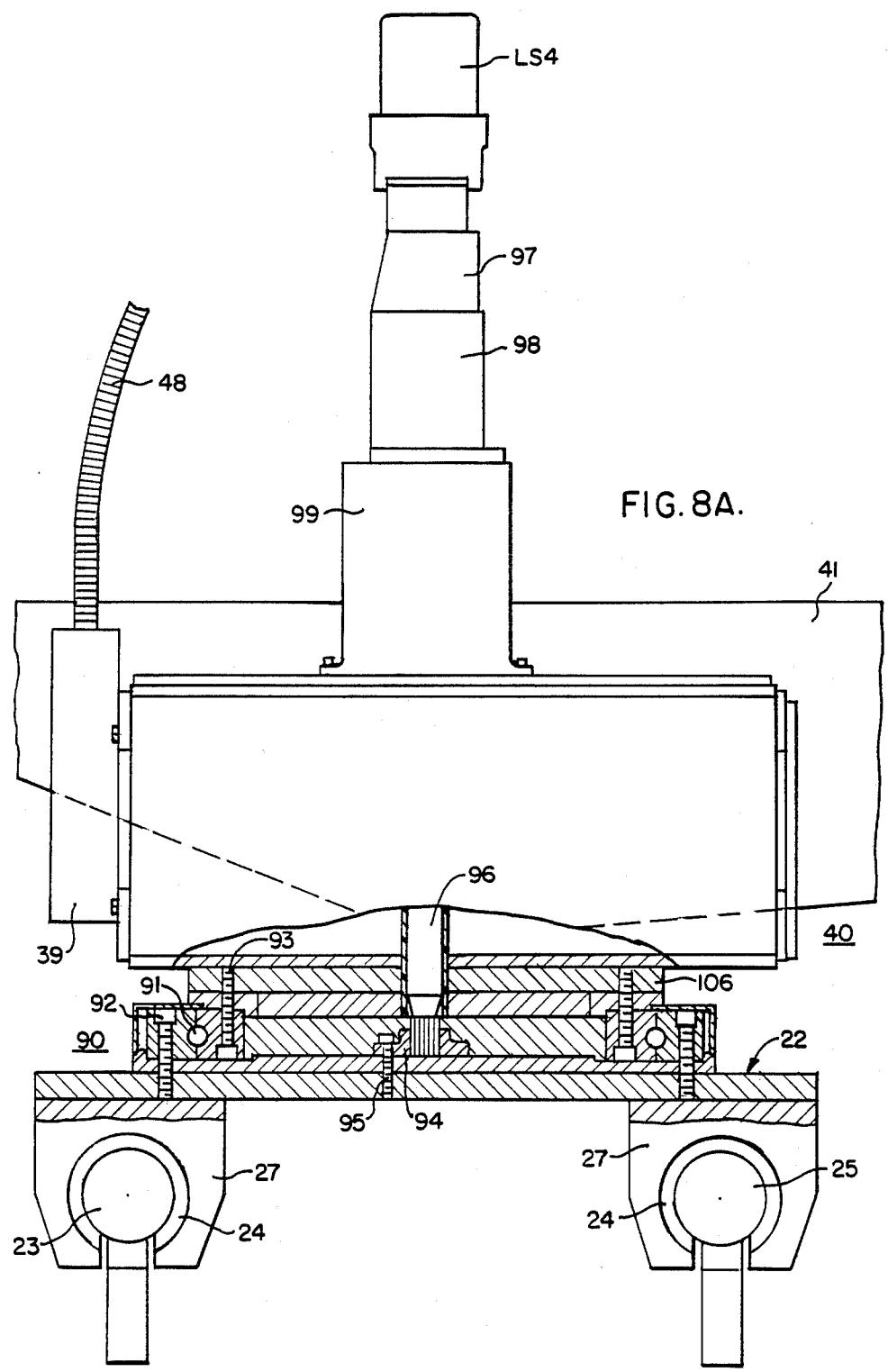

GENERAL PURPOSE ORTHOGONAL AXES MANIPULATOR SYSTEM

BACKGROUND OF THE INVENTION

The general acceptance of industry automation as an essential requirement for improving productivity has increased the acceptance of the robot, or manipulator apparatus, as a mechanism for achieving automated industrial applications.

Numerous robot configurations have been designed to meet specific industrial needs, i.e., cutting, welding, assembly, etc. The designs of many of the commercially available robots are unique to a particular application and employ complex mechanical design features and sophisticated software and control functions dedicated to the specific industrial application.

The acceptance of robots as a useful industrial "tool" has resulted in a market demand for a robot system exhibiting the simplified design considerations of a machine tool suitable for control by conventional computer numerical control, direct numerical control and off-line programming with language such as Automatic Programmed Tool (APT).

SUMMARY OF THE INVENTION

The gantry design of the orthogonal axes manipulator system described herein with reference to the accompanying drawings reduces the complexity associated with conventional "shoulder/elbow/wrist" robot arms and permits programming in Cartesian coordinates as contrasted with the more complicated polar coordinates. The disclosed design provides a rigid manipulator that supports machine tool-type interpolation moves, high accuracy and repeatability while permitting robotic type velocity and dexterity.

The gantry type design provides for an overhead X axis assembly supported by vertical structural members. The Y axis assembly extends as an arm from the X axis assembly and further supports a vertical Z axis assembly. In addition to the orthogonal X, Y and Z axes assemblies, a mounting surface on the Z axis assembly is designed to accommodate a multiple axes rotary wrist to which an appropriate end effector, i.e., gripper, welding torch, etc., can be attached.

The open structure design of the gantry type robot system permits integration of positioners, conveyors, and other auxiliary units in either perpendicular or parallel orientation to the manipulator system to accommodate a work area of a production floor layout. The open design also provides easy access to the wrist, end effectors and working envelope of the manipulator system for ease of tool changes and maintenance.

The mechanical drives associated with the X and Y axes assemblies are rack and pinion mechanisms which are driven by a DC drive motor-tachometer package that is direct-coupled through a 5:1 gearbox equipped with an anti-backlash resolver. The Z axis assembly utilizes a ball-screw mechanism with a fixed nut. The ball screw is anti-backlash direct coupled to a DC drive motor-tachometer package and is equipped with a power off brake. Way systems, or dual rail guide systems, employed in each orthogonal axis assembly consists of case-hardened rails. Each axis assembly includes a movable carriage coupled to the dual rail guide system by linear bearings. A control console responds to speed feedback information from the tachometers and position feedback information from the resolvers of each axis assembly to control the movement of the respective carriages in a closed loop arrangement. The direct coupling of the DC motor to the mechanical drive provides accurate, positive control of the movement of the carriage.

The disclosed manipulator system may be programmed from a numerical control console, a teach pendant, or an off-line computer. To program the system with the teach pendant, command is obtained by selecting the teach pendant function on the control console, placing the system in the teach mode, and selecting a program number. This procedure transfers control of the linear motion of the X, Y and Z axes assemblies and the rotary motion of multiple axis rotary wrist to the pendant. The operator then manually runs the manipulator system through a complete cycle, programming each point, selecting fast or slow teach speeds or incremental jogs, to identify the process points, i.e. welding, assembly, etc. After completing the point programming with the pendant, the operator identifies operating functions such as subroutine calls, dwells, and running speed at the control console. The program is then recorded in memory. To run a program the operator simply selects a program at the console, puts the system in "auto-mode" and presses "cycle start".

The machine tool design features of the manipulator system which enable it to be programmed for control by numerical control techniques provide operational capabilities that make it ideal for automated operation. These features include simultaneous control of all linear and rotary axis motion, circular and linear contouring, and the use of software limit switches. The disclosed manipulator system can be directly integrated with a direct numerical control system and has a capacity to interface with various peripherals and auxiliary equipment such as parts positioners, inspection equipment, conveyors, automatic fixturing, sensory feedback systems and other subordinate equipment and systems.

The unique combination of sophisticated robot design with proven numerical control techniques bridges the gap between robot and machine tool technology.

DESCRIPTION OF THE DRAWING

The invention will become more readily apparent from the following exemplary description in connection with the accompanying drawings:

FIG. 5A is an end view of the manipulator system of FIG. 1;

FIG. 5B is an illustration of the drive mechanism for the X axis assemblies;

FIG. 6A is a plan, or top, view of the manipulator system of FIG. 1,

FIG. 6B illustrates the double tapered design of the support structure of the Y axis assembly;

FIGS. 7A and 7B are sectioned illustrations of the Z axis assembly of the manipulator system of FIG. 1;

FIGS. 8A and 8B are illustrations of a rotary index mechanism for the manipulator system of FIG. 1.

DESCRIPTION OF THE PREFERRED EMBODIMENT

Figure 1:
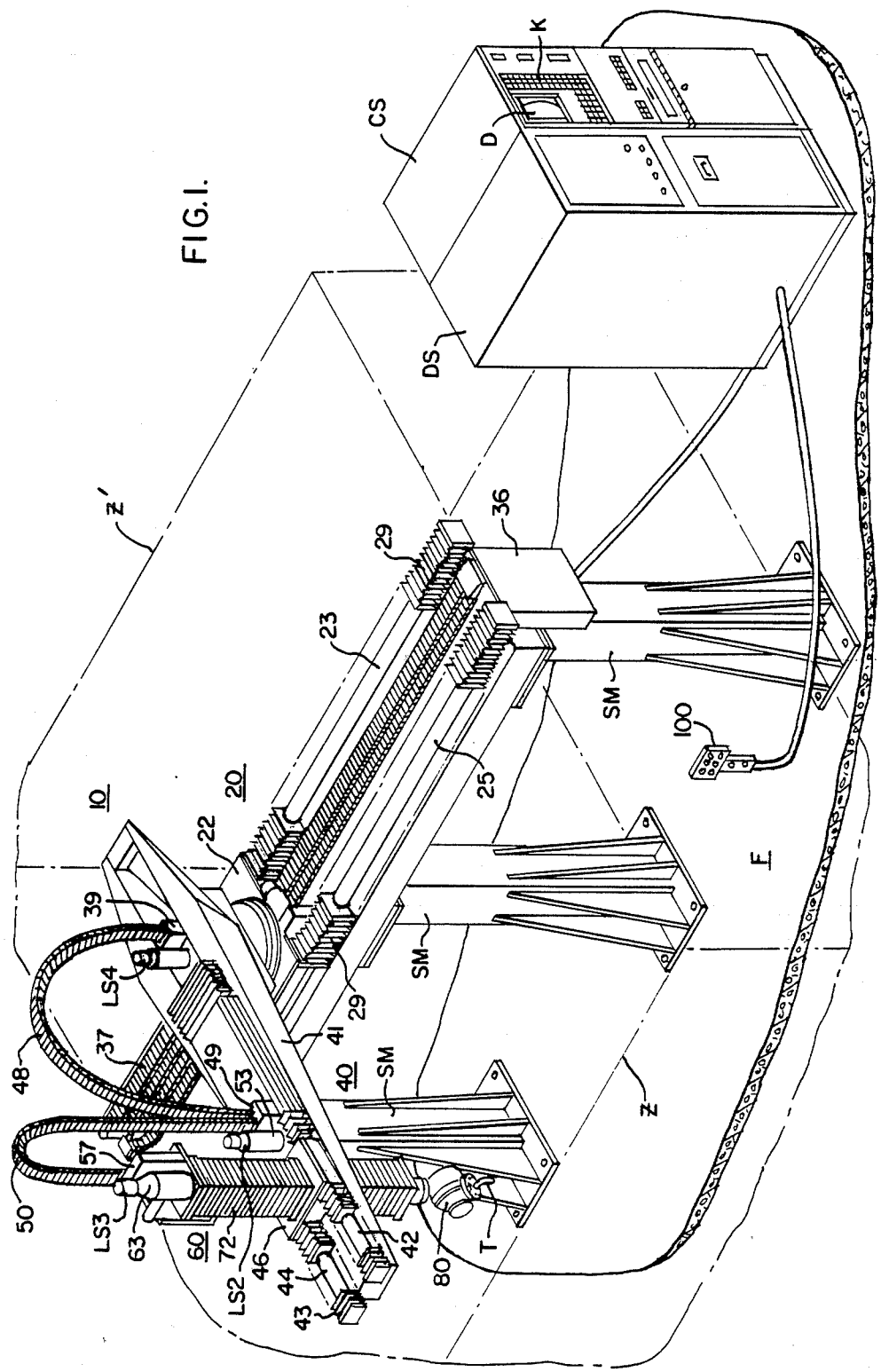
FIG. 1 is an isometric view of an orthogonal axis manipulator system incorporating the inventive features.

Referring to FIG. 1 there is pictorially illustrated a manipulator system 10 comprising three orthogonal axes assemblies consisting of the X axis assembly 20, Y axis assembly 40, and Z axis assembly 60. An optional multiple axis rotary wrist mechanism 80 is mechanically secured to the Z axis assembly 60 to accommodate an end effector T, which may typically be a gripper, a welding torch, etc. For the purposes of discussion it will be assumed that the wrist mechanism 80 is a commercially available two-axis rotary wrist.

The operative combination of the X, Y and Z axis assemblies is supported in a gantry type configuration by the vertical support members SM which are secured to the floor F of the work facility. Machine tool type control of the operation of the manipulator system 10 is implemented by a conventional numerical control console CS, such as the PRODUCER TM CNC System which is available from the Westinghouse Electric Corporation. The orthogonal axis machine tool type configuration of the X, Y and Z axis assemblies elevated in the gantry configuration of FIG. 10 results in an optimized working envelope corresponding to the rectangular volume work zone Z. This gantry configuration of an orthogonal axis manipulator system significantly reduces the number of wrist articulations required to implement the desired work process, and further reduces requirements for auxiliary devices such as rotary tables. Pulse width modulated drive for the closed loop DC servo motor arrangements of each axis assembly is provided through the use of conventional drive circuitry located in the drive cabinet DS. The direct coupled DC servo motor arrangements include a motortachometer package and a resolver. The tachometer provides speed feedback information to the control console CS while the resolver supplies the control console CS with position feedback information directly from the drive motor. This provides a highly stable servo response.

Figure 2:
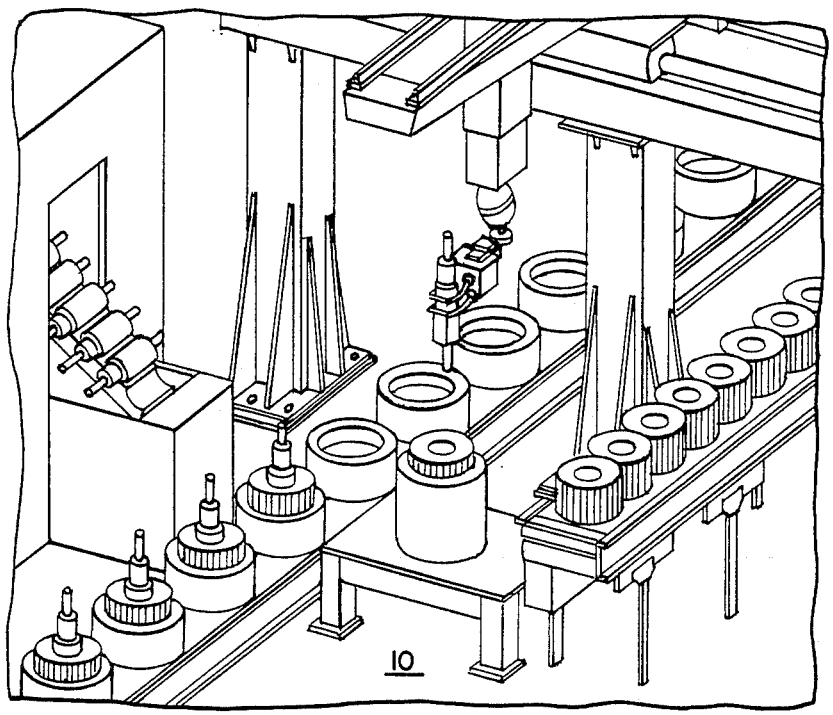
FIGS. 2, 3 and 4 are pictorial illustrations of applications of the manipulator system of FIG. 1.
Figure 3:
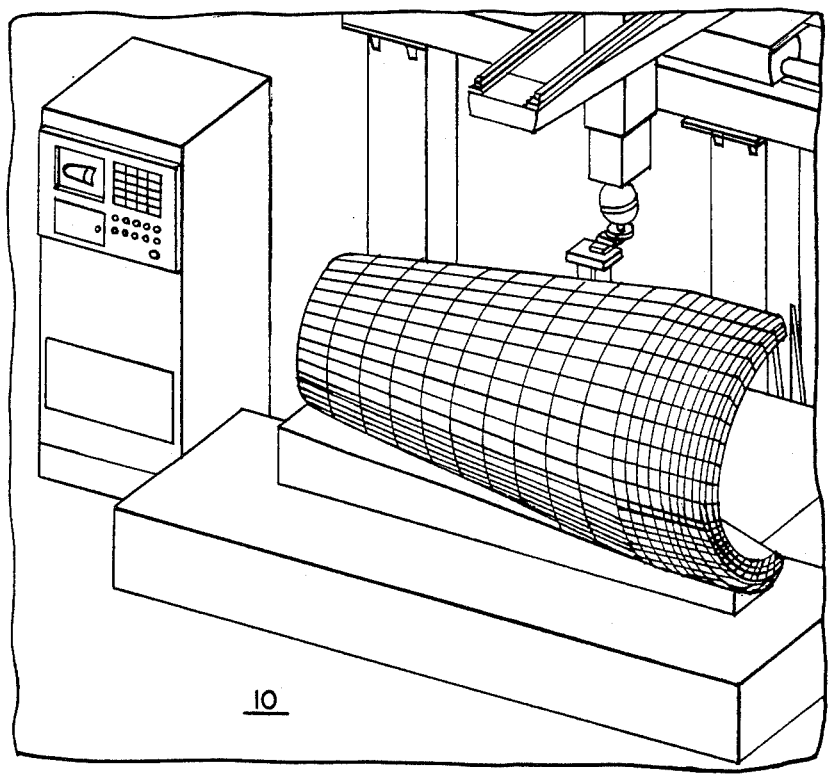
Figure 4:
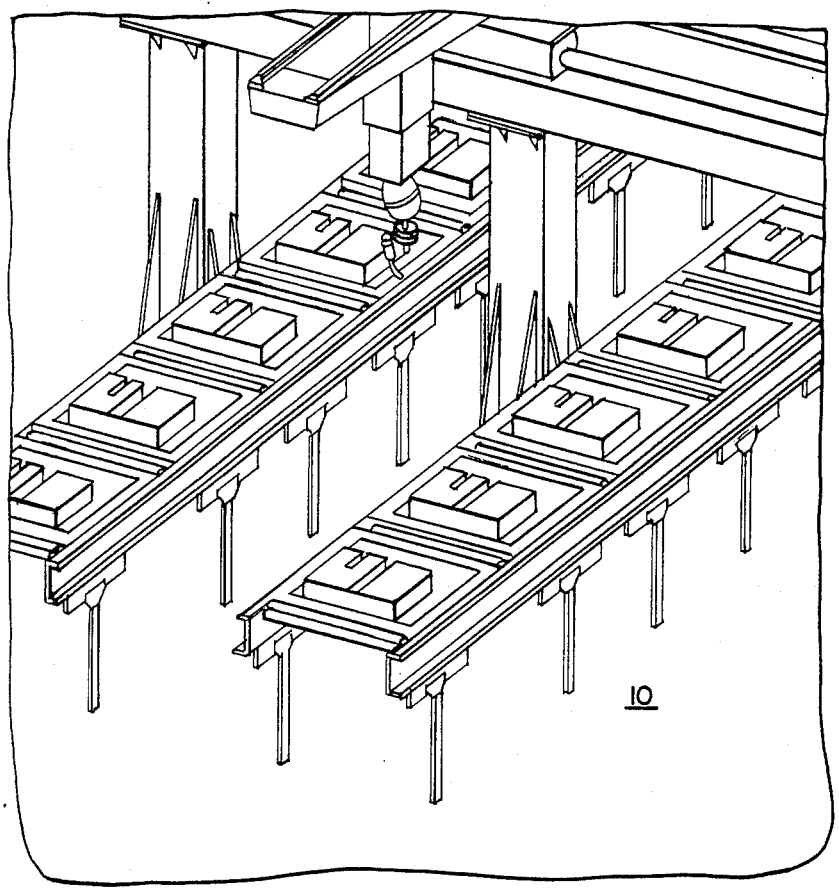

The application versatility of the orthogonal axis manipulator system 10 is typically illustrated in FIGS. 2, 3 and 4. In the embodiment of FIG. 2 the application of the system 10 for material handling and heavy parts assembly is illustrated.

Sophisticated controls, precision operation and large working envelope provides the ability to trim, buff, drill and perform automated testing and inspection of large complex contours as illustrated in FIG. 3.

Precise mechanical articulations permit application in welding and burning operations, as illustrated in FIG. 4. The open structure design of the manipulator system 10 tends to facilitate servicing of several production conveyors.

The X axis assembly 20, as shown in FIGS. 1, 5A and 5B, consists of a closed cell type of construction which minimizes the torsional deflection of the X axis carriage 22 as it travels along the X axis guidance system, thereby providing desired system accuracy and repeatability. The X axis guidance system, or way system, includes 2, 3-inch diameter ground guide rails 23 and 25 which provide maximum rigidity and stiffness for the torsional-type bending modes. The dual rail way system, which is supported by the members SM, further assures a smooth, low friction travel of the X axis carriage 22 in response to the closed loop DC servo control.

The X axis carriage 22 is coupled to the guide rails 23 and 25 by the linear bearings 24 which are preloaded and sealed in the housings 27 to protect the bearings from dirt. The bearings and rails are available from Thomson Industries. The guide rails 23 and 25 are protected from dirt and damage by bellows-type covers 29.

The mechanical drive for the X axis assembly 20 is a rack and pinion mechanism consisting of rack 30 and pinion shaft 31 which is direct coupled to the DC motortachometer package 26 through a 5:1 gearbox 32 equipped with an anti-backlash resolver 33. The gearbox 32 is designed such that the pinion shaft 31 is machined into the output shaft of the gearbox 32, thus preventing parts from coming loose or changing position.

The direct coupling of the drive motors of the axis assemblies through low backlash drive elements minimizes lost motion.

The rack and pinion mechanical drive has been selected for the X and Y axis assemblies to accommodate easy extension of the X and Y travel distances by adding additional sections of rack and extending the length of the guide rails.

Several types of limit switches are associated with the X axis assembly 20 including software limit switches which are stored in the memory of the control console CS, and hardware limit switches. The hardware limit switch package LS1 is provided for sensing end of travel of the X axis carriage 22, and the home location of the X axis carriage 22. The hardware limit switches provide a back-up to the software limit switches and function to prevent "hard-stops" of the moving carriage 22 in the event the software limit switches are inoperative.

A safety limit switch is further provided in the limit switch package LS1 to subdivide the work zone Z of the system 10 into two discrete working sectors. If the system is not programmed to enter a given sector, any unpredictable attempts by the X axis carriage 22 to move into that sector will result in activation of the safety limit switch which in turn initiates a system emergency stop. The limit switch packages described herein are commercially available from the Micron Instrument Corporation.

Electrical control and drive excitation for the system 10 from cabinets CS and DS is provided by cabling entering the junction box 36.

The cabling for the manipulator system 10 as shown in FIGS. 1, 5A and 6A, extends from the junction box 36 at the end of the X axis structure 20 and continues through the flexible cable carrier 37 to a junction box 39 on the movable X axis carriage 22.

The Y axis assembly 40, as shown in FIGS. 5A and 6A, functions as an arm extending perpendicularly from the X axis assembly 20. It includes a Y axis support member 41 and a double rail way arrangement comprising guide rails 42 and 44 to minimize the stresses and rotational deflections during the Y axis travel of the Y axis carriage 46 as well as during the positioning of the Z axis assembly 60 within the work zone Z. The guide rails 42 and 44 are protected by bellows covers 43.

Of particular concern are the stresses concentrated at the point of attachment of the Y axis support member 41 with the X axis assembly 20 and the structural deflections which are transmitted to the wrist mechanism 80. The Y axis support member 41 is uniquely designed, as illustrated in FIG. 6B, with a double taper T1 and T2 that effectively concentrates the mass of the support member 41 where the bending moment is highest, namely, at the interface with the X axis assembly 20, and reduces the mass at the end where the bending consideration is less. This design provides the advantage of reducing the moving mass of the Y axis assembly 40 thereby improving the overall accuracy of the manipulator system 10. The mechanical drive for the Y axis assembly 40 consists of a rack and pinion mechanism 45 similar to that described above with respect to the X axis assembly 20.

The DC servo drive for the Y axis assembly 40, which is similar to that for the X axis assembly 20, includes a drive motor-tachometer package 51, gearbox-resolver package 52 and a hardware limit switch package LS2 which provides end of travel and home location limits as backup to the stored software limit switches.

The hardware limit switch packages LS1 and LS2 employed in the X and Y axes assemblies 20 and 40 mount on the back of the respective DC servo drive motors 26 and 51 to count the number of turns of the motor before actuating the limit switch either to an open or closed position to signal the control console CS that the respective assembly carriage has arrived at home location or has reached the end of travel limit. This limit switch package contrasts with the traditional toggle-type limit switches which are typically located at the end of the axis travel structures. The hardware limit switch packages associated with the motors reduce significantly the wiring complexity typically associated with the conventional toggle-type limit switch.

The cabling associated with the Y axis assembly 40, as well as that servicing the Z axis assembly 60 and the wrist mechanism 80, is positioned in the cable carrier 48 which extends from the junction box 39 of the X axis carriage 22 to the junction box 49 of the Y axis carriage 46. The cable carrier 50, which is connected between the junction box 49 and the Z axis assembly junction box 57, services the Z axis assembly 60 and the wrist mechanism 80.

The vertical Z axis assembly 60, as shown in FIGS. 5A, 7A and 7B, employs a ball-screw mechanical mechanism consisting of a ball screw 61 and a fixed nut 62 in combination with a way mechanism consisting of guide rails 64 and 66 to transport the Z axis carriage 65 in response to the drive motor-tachometer package motor 63. The dual rail way mechanism functions similarly to that described above with respect to the X and Y axis assemblies 20 and 40.

The mounting of the ball-screw mechanism is accomplished through the use of duplex bearings 67 and 68 at either end to provide the necessary stiffness to accommodate high RPM drive of the ball screw 61 by the drive motor-tachometer package 63. The drive motor-tachometer package 63 is connected to the ball screw 61 by an antibacklash coupler 69 which compensates for misalignment.

As a result of the unique design of the Z axis assembly 60 there is no requirement for a counterbalance to compensate for the weight of the Z axis structure 60 and the ultimate payload which is manipulated by the end effector T affixed to the wrist mechanism 80. The drive motor-tachometer package 63 maintains the position of the Z axis assembly 60 during power on conditions. However, in a power off condition it is possible for the weight of the Z axis assembly 60 to back drive the ball-screw mechanism. Therefore a power off-brake on arrangement 70, which is commercially available from Electroid Inc., has been provided to prevent back driving of the Z axis assembly 60 during the power off condition.

The vertical Z axis assembly 60 has been designed such that the way system consisting of the dual guide rails 64 and 66, and the ball-screw mechanism are located on the centerline of the Z axis assembly 60 such that the vertical loads supported by the ball-screw mechanism act through the centerline of the assembly 60.

The vertical Z axis assembly 60 is also equipped with a bellows-type cover 72 to protect the ball-screw mechanism and the dual guide rails 64 and 66 of the way system. The cable servicing the wrist mechanism 80 extends from the junction box 57 through the bellows cover 72.

While the wrist mechanism 80 has been illustrated as being secured to the Z axis assembly 60, in those applications where the rotary motion capabilities of the wrist mechanism 80 are not required, the wrist mechanism 80 can be removed and the appropriate end effector T attached directly to the mounting surface 74 of the Z axis assembly 60. A hardware limit switch package LS3, similar to those described above, is mounted on the drive motortachometer package 63 and provides travel limit and home location information for the Z axis carriage 65. The commercially available limit switch package LS3 includes the resolver for the Z axis assembly.

Figure 8B:
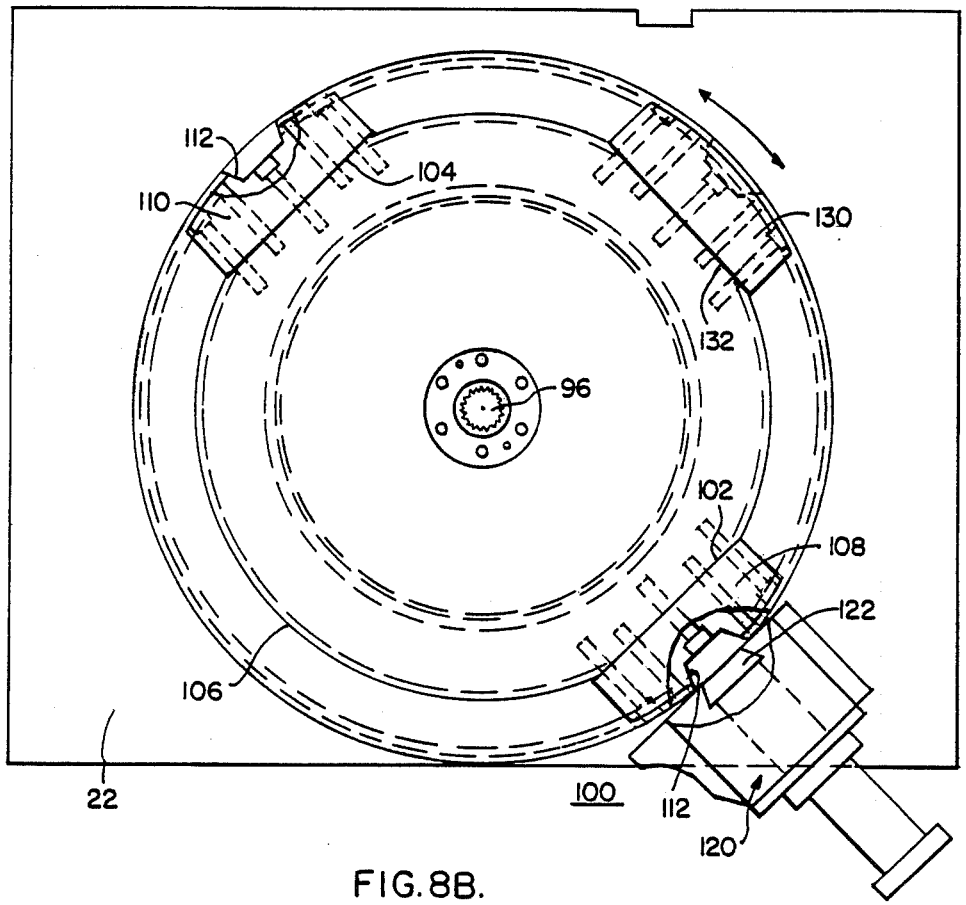

A rotary index unit 90, as illustrated in FIGS. 8A and 8B, increases the working envelope of the manipulator system 10. The unit 90 is located at the interface of the X axis carriage 22 and the Y axis assembly 40 to enable the Y axis assembly to be horizontally rotated 180° at the end of travel of the X axis carriage 22 such that the return travel of the X axis carriage 22 permits servicing of a second rectangular volume work zone Z' on the opposite side of the X axis assembly 20 as shown in FIG. 1.

A large preloaded bearing 91 is secured to the X axis carriage 22 by bolts 92 and to the Y axis assembly 40 by bolts 93. A spline assembly 94, which is secured to the X axis carriage 22 by bolt 95, accepts the spline end of a drive shaft 96. The horizontal rotation of the Y axis assembly 40 is effected by a drive system consisting of a drive motor-tachometer package 97 which is direct coupled to the drive shaft 96 via an anti backlash coupler 98 and a gear reduction unit 99. At the 0° and 180° motion end points, corresponding to the locations where the Y axis assembly 40 is perpendicular to the X axis assembly 20, a mechanical fastening arrangement 100 illustrated in FIG. 8B locks the Y axis assembly 40 in position.

Flat surfaces 102 and 104 are machined into the collar 106 of the Y axis assembly 40 at the 0° and 180° rotation points. Mechanical adapters 108 and 110, each including a wedge receptacle 112, are secured to the surfaces 102 and 104 respectively. When the Y axis assembly 40 is aligned with either the 0° or 180° rotation point, as indicated by a limit switch of the limit switch package LS4, the drive motor-tachometer package 97 is de-energized and a solenoid activated plunger device 120 is energized causing a wedge shaped plunger element 122 to be inserted into the receptacle 112. This action locks the Y axis assembly in position relative to the X axis assembly 20. The wedge shape of the plunger element 122 compensates for any slight misalignment between the receptacle 112 and the wedge element 122.

In the event an intermediate position is desired, such as 90°, to enable the manipulator system 10 to interface with a work station at the end of the X axis assembly 20, a mechanical adapter 130 can be secured to a flat surface 132 machined into the surface of the collar 106 at the 90° rotation point.

A limit switch contained in the device 120 indicates whether or not the plunger element 122 is engaging the collar 106. The rotary index function effected by the DC servo motor 97 and the solenoid activated plunger device 120 is controlled by the control console CS in response to limit switch conditions of packages LS1 and LS4 and the limit switch of the device 120. A resolver may be coupled to the electric drive of the rotary index unit 90 to replace the function of the limit switches and provide servo control of the rotary index function.

Inasmuch as the design of the manipulator system 10 is such that conventional machine tool programming and control techniques can be employed, the implementation of the control function associated with the system 10 may take one of several forms. The available programming techniques include the conventional teach by lead-through technique whereby the teach pendant 100 of FIG. 1 is provided and the system 10 is jogged through a series of point positions, with each point being recorded in the memory of the control console CS. A second type of programming instruction provides manual data input whereby an operator, using the keyboard K of the control console CS, can enter a program and have it stored in memory.

Off-line programming is available through the use of post processor software to generate the necessary machine coding for use by the control console CS. A typical post processor software language is APT.

A cathode ray tube display D provides the operator with information pertaining to the operation of the manipulator system 10. A commercially available system, such as the Westinghouse system described above, enables the operator to display the position of the end effector T, as well as access programs which have been placed in storage, modify programs and write new programs. Data entry via cassette and paper tape reader is also available.

Figure 9:
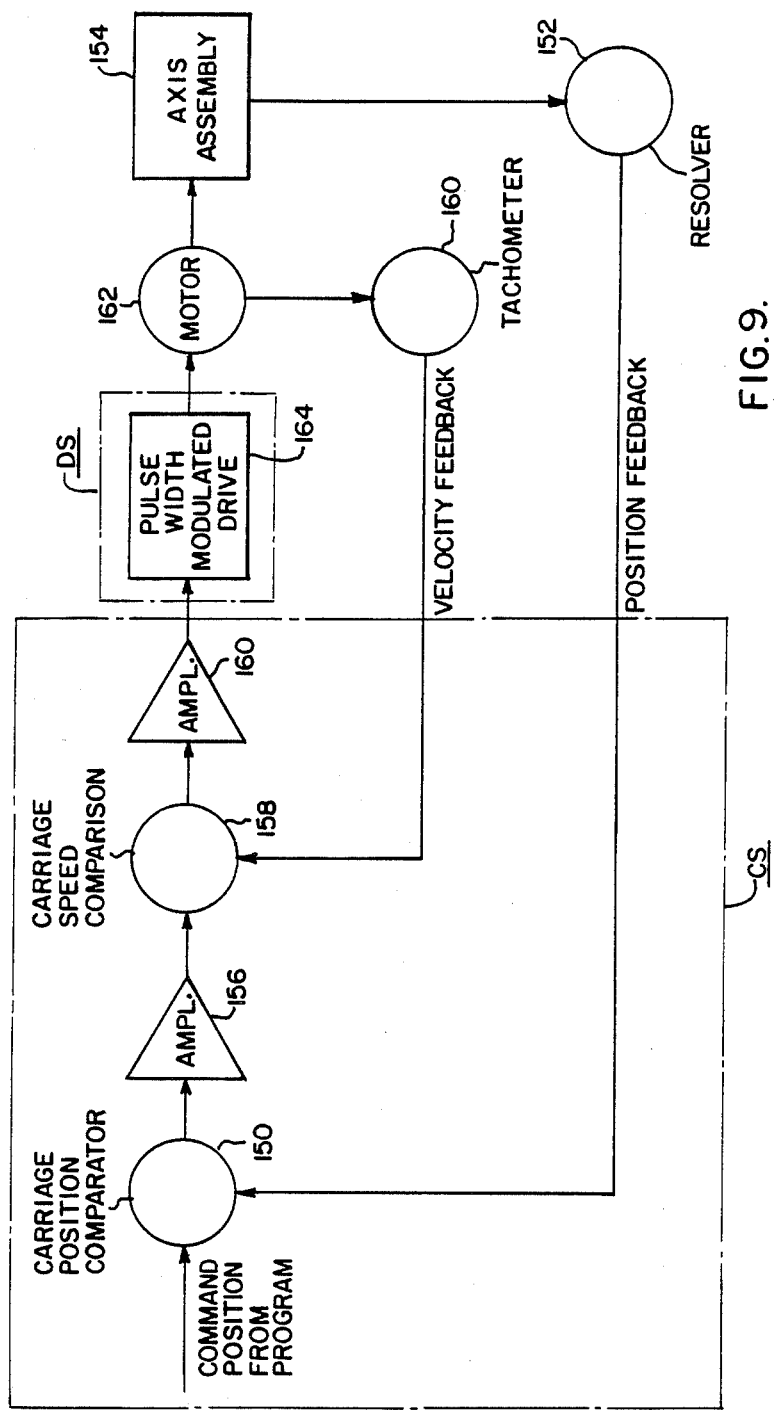
FIG. 9 is a block diagram electrical schematic of the control function associated with the manipulator system of FIG. 1.

A basic servo block diagram schematic illustration of the control of the manipulator system 10 is illustrated in FIG. 9. The closed-loop servo configuration of each axis assembly, including the linear motion axes X, Y and Z and the rotary motion axis of the wrist mechanism 80 is funtionally depicted in FIG. 9. The control console CS includes a carriage position comparator 150 which compares a carriage command signal to an actual carriage position signal from the resolver 152 of the axis assembly 154 and transmits a resultant carriage position signal through the amplifier 156 to a carriage speed comparator 158. The speed comparator 158 compares the position signal to a velocity feedback signal from a tachometer 160 coupled to the DC drive motor 162 which drives the carriage of the axis assembly 154 in response to a pulse width modulated drive 164.

The carriage speed signal developed by the speed comparator 158 is supplied through an amplifier 166 to control the operation of the pulse width modulated drive 164 of the drive cabinet DS.

What we claim is:

1. A gantry type orthogonal axis manipulator system exhibiting machine tool design features which permit off-line programming in Cartesian coordinates using conventional numerical control techniques, comprising:

X, Y and Z axis assemblies, each assembly including a guide means, a carriage means coupled to the guide means and a drive means for controlling the travel of the carriage along said guide means, said assemblies being operatively coupled to form an orthogonal axis manipulator system;

means for supporting said orthogonal axis manipulator system in an elevated position above a first work area, such that X axis assembly is maintained in a fixed elevational position by the supporting means;

said guide means of said X and Y axis assemblies including a horizontally disposed dual guide rail system to provide rigidity and minimize deflection resulting from torsional-type bending modes during the travel of the carriage means along the guide means;

the Y axis assembly being coupled to said X axis carriage means and including a Y axis support arm extending from said axis carriage means and supporting the guide means and carriage means of said Y axis assembly, wherein the Z axis assembly is coupled to said Y axis carriage means and includes a vertically disposed dual guide rail system to provide rigidity and minimize deflection resulting from torsional-type bending modes during the travel of the carriage means along the guide means;

said drive means of each assembly including a mechanical drive means connected to the respective carriage means and a DC servo motor means with resolver feedback in a closed loop configuration coupled to said mechanical drive means to cause said carriage means to traverse the respectivee guide means in response to carriage position signals;

rotary index means for horizontally rotating said Y axis assembly about said X axis carriage at the end of travel of said X axis carriage on the guide means of said X axis assembly from a first position serving said first work area on one side of said X axis assembly to at least a second position on the opposite side to serve a second work area in response to a rotary control drive signal, and control means connected to the DC servo motor means of the drive mean of said X, Y and Z axes assemblies to provide said carriage position signals to control of the movement of the respective carriage means, and connected to said rotary index means to provide said rotary control drive signal.

2. In a system as claimed in claim 1 wherein the mechanical drive means of each of said X and Y axis assemblies consist of a rack and pinion mechanism, and the mechanical drive means of said Z axis assembly consisting of a ball screw mechanism.

3. In a system as claimed in claim 1 including limit switch means coupled to the DC servo motor means of each assembly to indicate the end of travel limits of the respective carriage means as a function of the number of revolutions of said DC servo motor means.

4. In a system as claimed in claim 1 wherein said Y axis assembly includes a Y axis support arm extending from said X axis carriage means and supporting the guide means and carriage means of said Y axis assembly, said Y axis support arm being tapered at the end which is remote from said X axis carriage means to concentrate the mass of the Y axis support arm at the X axis carriage means to reduce the moving mass of the Y axis support arm and improve the accuracy of the positioning of the Z axis assembly being transported on the Y axis carriage means.

5. In a system as claimed in claim 1 further including a multiple axis rotary wrist mechanism attached to said Z axis assembly and being responsive to position signals to provide controlled rotary axis motion in combination with the linear axis motion of said X, Y and Z assemblies.

6. A system as claimed in claim 1 wherein said rotary index means provides for the selective positioning of said Y axis assembly means at points intermediate said first and second positions to service a third work area at the end of the guide means of said X axis assembly.

7. A system as claimed in claim 2 wherein a gear arrangement couples said DC servo motor means to the pinion of said rack and pinion mechanism, the output shaft of said gear arrangement being the pinion of said rack and pinion mechanism.

8. A system as claimed in claim 2 wherein the combination of the dual guide rail way system and the ball-screw mechanism of the Z axis assembly are located on the centerline of the Z axis assembly such that the vertical loads supported by the ball-screw mechanism act through the centerline of the Z axis assembly.

9. A system as claimed in claim 2 further including a power off-brake on means associated with said Z axis assembly to prevent back driving of the Z axis assembly during power off conditions.

10. A gantry type orthogonal axis manipulator system exhibiting machine tool design features which permit off-line programming in Cartesian coordinates using conventional numerical control techniques, comprising:

X, Y and Z axis assemblies, each assembly including a guide means, a carriage means coupled to the guide means and a drive means for controlling the travel of the carriage along said guide means, said assemblies being operatively coupled to form an orthogonal axis manipulator system;

means for supporting said orthogonal axis manipulator system in an elevated position above a first work area, such that X axis assembly is maintained in a fixed elevational position by the supporting means;

said guide means of said X and Y axis assemblies including a horizontally disposed dual guide rail system to provide rigidity and minimize deflection resulting from torsional-type bending modes during the travel of the carriage means along the guide means;

the Y axis assembly being coupled to said X axis carriage means and including a Y axis support arm extending from said X axis carriage means and supporting the guide means and carriage means of said Y axis assembly, said Y axis support arm including first and second tapered sections at the end which is remote from said X axis carriage means to concentrate the mass of the Y axis support arm closer to the X axis carriage means than an arm with constant cross section in order to reduce the moving mass of the Y axis support arm and improve the accuracy of the positioning of the Z axis assembly being transported on the Y axis carriage means, said first and second tapered sections defining therebetween an open center line area through which the Z axis depends, which Z axis assembly further includes a vertically disposed dual guide rail system to provide rigidity and minimize deflection resulting from torsional-type bending modes during the travel of the carriage means along the guide means;

said drive means of each assembly including a mechanical drive means connected to the respective carriage means and a DC servo motor means with resolveer feedback in a closed loop configuration coupled to said mechanical drive means to cause said carriage means to traverse the respective guide means in response to carriage position signals; and control means connected to the DC servo motor means of the drive means of said X, Y and Z axes assemblies to provide said carriage position signals to control of the movement of the respective carriage means.

11. In a system as claimed in claim 10 wherein the mechanical drive means of each of said X and Y axis assemblies consist of a rack and pinion mechanism, and the mechanical drive means of said Z axis assembly consisting of a ball screw mechanism.

12. In a system as claimed in claim 10 including limit switch means coupled to the DC servo motor means of each assembly to indicate the end of travel limits of the respective carriage means as a function of the number of revolutions of said DC servo motor means.

13. In a system as claimed in claim 10 further including a multiple axis rotary wrist mechanism attached to said Z axis assembly and being responsive to position signals to provide controlled rotary axis motion in combination with the linear axis motion of said X, Y and Z assemblies.

14. A system as claimed in claim 11 wherein a gear arrangement couples said DC servo motor means to the pinion of said rack and pinion mechanism, the output shaft of said gear arrangement being the pinion of said rack and pinion mechanism.

15. A system as claimed in claim 11 wherein the combination of the dual guide rail way system and the ball-screw mechanism of the Z axis assembly are located on the centerline of the Z axis assembly such that the vertical loads supported by the ball-screw mechanism act through the centerline of the Z axis assembly.

16. A system as claimed in claim 11 further including a power off-brake on means associated with said Z axis assembly to prevent back driving of the Z axis assembly during power off conditions.

17. The system as claimed in claim 10 further including a rotary index means for horizontally rotating said Y axis assembly about said X axis carriage at the end of travel on the guide means of said X axis assembly of said X axis carriage from a first position serving said first work area on one side of said X axis assembly to at least a second position on the opposite side to serve a second work area in response to said control means.

18. A system as claimed in claim 17 wherein said rotary index means provides for the selective positioning of said Y axis assembly means at points intermediate said first and second positions to service a third work area at the end of the guide means of said X asis assembly.

* * * * *